(12) United States Patent
Sten et al.

(10) Patent No.: US 11,739,815 B2
(45) Date of Patent: Aug. 29, 2023

(54) GEAR ASSEMBLY FOR USE IN ELECTRIC DRIVE TRANSMISSIONS

(71) Applicant: Volvo Car Corporation, Gothenburg (SE)

(72) Inventors: Erik Sten, Säve (SE); Peter Petrov, Angered (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/713,349

(22) Filed: Apr. 5, 2022

(65) Prior Publication Data
US 2022/0325781 A1  Oct. 13, 2022

(30) Foreign Application Priority Data
Apr. 12, 2021 (EP) .................................. 21167779

(51) Int. Cl.
| | | |
|---|---|---|
| *B60K 17/12* | (2006.01) | |
| *F16H 3/56* | (2006.01) | |
| *B60K 17/02* | (2006.01) | |
| *B60K 1/00* | (2006.01) | |
| *F16H 1/28* | (2006.01) | |

(Continued)

(52) U.S. Cl.
CPC .............. *F16H 3/56* (2013.01); *B60K 17/02* (2013.01); *B60K 17/12* (2013.01)

(58) Field of Classification Search
CPC ...... F16H 3/56; F16H 48/00–2048/426; B60K 14/02; B60K 17/02; B60K 17/12
See application file for complete search history.

(56) References Cited

U.S. PATENT DOCUMENTS 9,062,744 B2 *  6/2015  Valente ............... G01N 30/8624
9,156,348 B1 * 10/2015  Swales ..................... B60K 1/00
(Continued)

FOREIGN PATENT DOCUMENTS

DE    102013205013 A1   9/2014
DE    102019119955 A1   1/2021
(Continued)

OTHER PUBLICATIONS

Sep. 9, 2021 European Search Report issued on International Application No. EP 21 16 7779.
(Continued)

*Primary Examiner* — Tinh Dang
(74) *Attorney, Agent, or Firm* — Clements Bernard Walker; Christopher L. Bernard (57) ABSTRACT

A gear assembly including: a drive gear adapted to be connected to an output shaft of an electric motor and being rotatable around a transmission axis; a planetary gear assembly including at least one sun gear, two or more planetary gear members rotatably supported on a carrier about respective planetary gear axes and meshing with the at least one sun gear and optionally a ring gear, an input stage connected to the drive gear, and an output stage adapted to be connected to a drive member for rotation of the drive member about the transmission axis; a clutch member adapted for slippingly connecting the ring gear with the carrier or with the drive member; and a brake member adapted for fixedly engaging a part of the planetary gear assembly with a locking part of the gear assembly.

6 Claims, 6 Drawing Sheets

(51) Int. Cl.
*F16H 37/08* (2006.01)
*F16H 57/08* (2006.01)

(56) References Cited

U.S. PATENT DOCUMENTS

| 9,625,021 | B2* | 4/2017 | Knoblauch | F16H 37/0833 |
| 2013/0203543 | A1* | 8/2013 | Sten | F16H 48/36 |
| | | | | 475/150 |
| 2019/0283566 | A1* | 9/2019 | Nilsson | B60K 6/48 |
| 2020/0096084 | A1* | 3/2020 | Engerman | B60K 1/00 |

FOREIGN PATENT DOCUMENTS

| JP | H05332405 A | 12/1993 |
| WO | 9602769 A1 | 2/1996 |

OTHER PUBLICATIONS

Xu et al.,11 Progress in Automotive Transmission Technology11, Automotive Innovation vol. 1, No. 3, Jul. 1, 2018, pp. 187-210.

\* cited by examiner

GEAR ASSEMBLY FOR USE IN ELECTRIC DRIVE TRANSMISSIONS

CROSS-REFERENCE TO RELATED APPLICATION

The present disclosure claims the benefit of priority of co-pending European Patent Application No. 21167779.4, filed on Apr. 12, 2021, and entitled "Gear Assembly for Use in Electric Drive Transmissions," the contents of which are incorporated in full by reference herein.

TECHNICAL FIELD

The present disclosure relates to a gear assembly for use in electric drive transmissions. The present disclosure also relates to an electric vehicle including such a gear assembly.

BACKGROUND

Electric drive transmissions in electric vehicles are usually made single speed, with a gear ratio that is a compromise between the maximum torque at start and acceleration and the maximum allowed speed of the electric motor. Using a single stage gear box operating in the low and high speed ranges results in an efficient drive train.

2-Speed electric drive trains are provided that result in further efficiency gain and in a longer range. Use of a 2-speed transmission allows downsizing of the electric motor.

In a known 2-speed electric drive, a planetary gear set is used in a two-speed transaxle having two clutches, one clutch connected to a sun gear and the other to a ring gear. For operation in the low speed range, the first clutch is deactivated so that power is transferred through the planetary gear set via the ring gear. For operation in the high speed range, the first clutch is activated and the second clutch is de-activated so that power is transferred via the sun gear, allowing the ring gear to freely spin without transferring any torque.

The known system results in losses in the planetary gear stage.

It is an object of the present disclosure to provide a drivetrain for an electric motor that is of compact and light construction and that has improved efficiency.

SUMMARY

Hereto a gear assembly, for use with an electric motor, according to the disclosure includes: a drive gear adapted to be connected to an output shaft of an electric motor, the drive gear being rotatable around a transmission axis; a planetary gear assembly including at least one sun gear, two or more planetary gear members rotatably supported on a carrier about respective planetary gear axes and meshing with the sun gear, and optionally a ring gear, an input stage that is connected to the drive gear, an output stage that is adapted to be connected to a drive member for rotation of the drive member about the transmission axis; a clutch member that is adapted for slippingly connecting the carrier or the ring gear with the drive member; and a brake member that is adapted for fixedly engaging a part of the planetary gear assembly with a locking part of the gear assembly; wherein, in a low speed range, the clutch member and the brake member are operated such that torque is transmitted from the drive gear to the planetary gear assembly, and through the output stage of the planetary gear assembly to the drive member; and wherein, in a high speed range, the clutch member and the brake member are operated such that the carrier is rotated about the transmission axis and torque is transmitted from the drive gear to the drive member via the carrier.

In the low speed range, the planetary gear stage according to the disclosure passes torque from the drive gear to the rotation member, which may include a differential housing. As power flows through the first stage of the drive gear and through the second planetary gear stage, a high gear ratio is achieved at reduced speed and higher torque.

In the high speed range, the clutch and brake members de-activate the planetary stage and couple it in rotation to the drive member, such that torque is transmitted from the electric motor to the rotation member through a single stage only, formed by the drive gear, while the planetary stage rotates together with the drive member around the transmission axis, which may be a wheel axle.

The single stage gear reduction in the high speed range results in reduced losses and in higher efficiency.

The drive gear may include a cylindrical gear, rotatable around the transmission axis. The transmission axis may include a wheel axle and the drive member may include a differential housing in an electric vehicle.

The planetary gear stage can be either a single or a compound type, depending on the gear ratio that is required.

With "locking part" as used herein it is intended to mean a part of the gear assembly that is stationary relative to the rotatable gears, such as for instance the gear housing.

Gear 1 may have a gear ratio in the range of 8 to 12 and will be used only for start and acceleration. The power flow goes first via the cylindrical gear stage and then through the planetary gear stage. Gear 2 can be considered as a single-stage reduction with a gear ratio of for instance 4.5 wherein the planetary gearset is deactivated by locking the ring gear to the differential housing and torque is transferred only via the cylindrical gear of stage 1.

In an embodiment of a gear assembly according to the disclosure, the planetary gear assembly includes an outer ring, the planetary gear members meshing with the outer ring and with the sun gear, the outer ring being connectable to the drive member via the clutch member, wherein the locking part engages the outer ring.

The embodiment of a single planetary gear can result in gear ratios of 2.5:1 and higher.

In an embodiment wherein for the planetary gear stage a lower gear ratio than 2.5:1 is required, which in the single planetary gear stage would result in the sun wheel becoming nearly equal in size to the ring and the diameter of the planetary gears decreasing, a compound planetary gear set is used.

An embodiment of a gear assembly according to the disclosure includes a compound planetary gear, the planetary gear members being supported on the carrier at spaced-apart positions along a carrier axis to be jointly rotatable about the carrier axis, the drive gear engaging the carrier for rotation of the carrier around the transmission axis, a first sun gear being rotatable about the transmission axis, meshing with the first planetary gear member, a second sun gear rotatable about the transmission axis fixedly connected to the drive member and meshing with the second planetary gear member, the brake member being connected to the first sun gear and to the locking part, which is non rotating, for preventing rotation of the first sun gear about the transmission axis when the brake member is engaged, and the clutch member being arranged for connecting the carrier with the drive member.

Another embodiment of a gear assembly according to the disclosure includes a compound planetary gear with the planetary gear members supported on the carrier at spaced-apart positions along a carrier axis, to be jointly rotatable about the carrier axis, the drive gear engaging the sun gears for rotation of the sun gears around the transmission axis, a first sun gear being rotatable about the transmission axis, meshing with the first planetary gear member, a second sun gear rotatable about the transmission axis fixedly connected to the drive member and meshing with the second planetary gear member, and the brake member being connected to the carrier and to the locking part, which is non rotating, for preventing rotation of the carrier about the transmission axis when the brake member is engaged.

BRIEF DESCRIPTION OF THE DRAWINGS

Some embodiments of a gear assembly according to the disclosure will by way of non-limiting example, be explained in detail with reference to the accompanying drawings. In the drawings.

DESCRIPTION OF EMBODIMENTS

Figure 1:
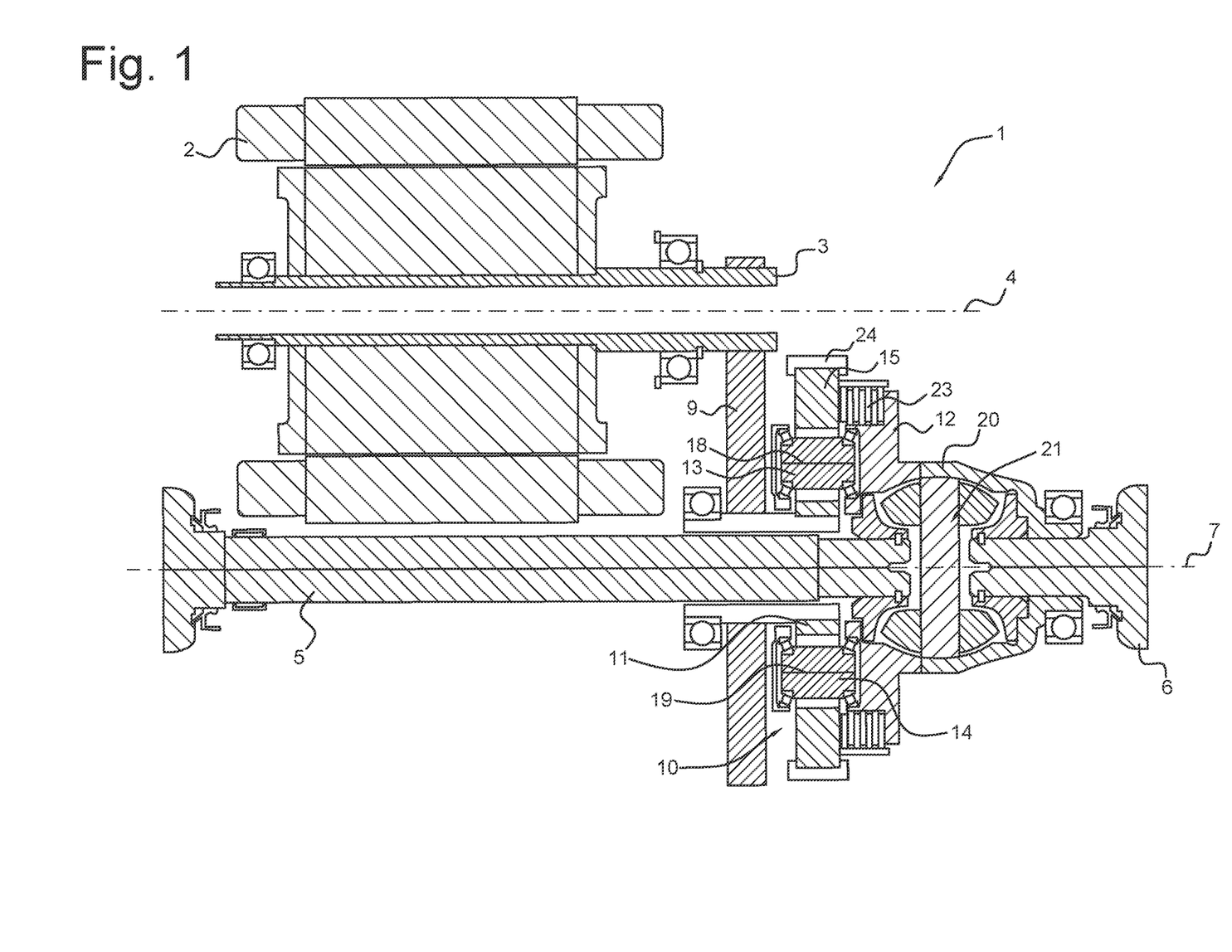
FIG. 1 shows a cross-sectional view through a gear assembly according to the disclosure, including a single planetary gear with an outer ring.

FIG. 1 show a gear assembly 1 that is connected to an electric motor 2 having output shaft 3 that is rotatable around an axis 4. The electric motor 2 drives output shafts 5, 6 that are each connected to a wheel (not shown) via a two stage gear assembly 8. The output shafts 5,6 can rotate around a transmission axis 7 that is parallel to the output shaft axis 3, and that is spaced at a distance of, for instance, 14 cm.

The two stage gear assembly 8 includes a cylindrical gear 9 and a planetary gear assembly 10. The planetary gear assembly 10 includes a sun gear 11, a carrier 12, planetary gears 13,14 and an outer ring gear 15 that meshes with the planetary gears 13,14. The planetary gears 13, 14 are supported on the carrier 12 to rotate about respective planetary gear axes 18,19. The carrier 12 is part of the housing 20 of a differential 21. The ring gear 15 is connected via a wet clutch 23 to the carrier 12 and to the housing 20 of the differential 21. A brake member 24, such as a mechanical diode, can selectively lock the ring gear 15 to a non-rotating part, for instance to the housing of the gear assembly 8.

In the low speed range, or first gear, the brake member 24 is engaged and the clutch 23 is released, so that the planetary gear is activated. The ring gear 15 is fixed to the housing and cannot rotate about the axis 7. The cylindrical gear 9 drives the sun gear 11, and power is transmitted by the carrier 12 to the housing 20 via the planetary gears 13, 14 that rotate about their respective axes 18,19 on the carrier 12. From the rotating differential housing 20, the power is transmitted to the differential 21 and to both output shafts 5,6. If the cylindrical gear has a gear ratio of about 4.5:1 and the single stage planetary gear has a minimum ratio of 2.5:1, the total gear ratio of the first gear is 4.5*2.5=11.25.

In the high speed range, or second gear, the brake member 24 is released and the clutch 23 is engaged so that the complete planetary gear assembly 10 is deactivated and locked to the differential housing 20. The second gear can be considered as a single-stage reduction with a gear ratio of for instance 4.5:1. This forms an efficient transmission compared to the two-stage gear train in the low speed range, and the aim is to drive in second gear as much as possible in the driving cycle.

Figure 2:
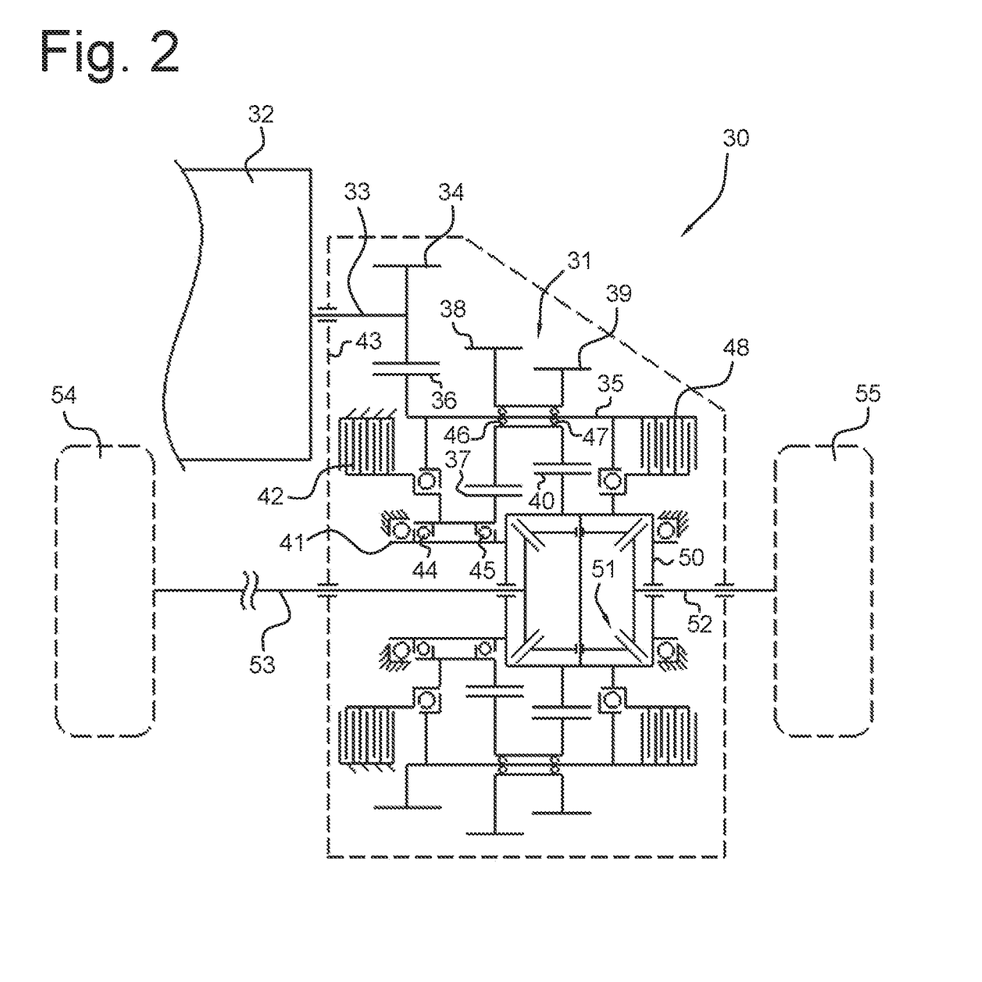
FIG. 2 shows a schematic view of an embodiment of a gear assembly including a compound planetary gear.

FIG. 2 schematically shows an embodiment of a gear assembly 30 with a compound planetary gear stage 31 that is suitable for obtaining gear ratios less than 11 in first gear. The rotor shaft 33 of the electric motor 32 and a pinion gear 34 are connected to a gear wheel 36 that is supported on a shaft 41 that is parallel to the rotor shaft 33. The pinion 34 and gear wheel 36 form the first gear reduction stage of the gear assembly 30.

The shaft of the gear assembly 30 is essentially designed as a planetary carrier 35 for the planetary gear set 31 which is the second gear reduction stage of the gearbox. The planetary gear stage 31 includes first sun gear 37, planetary gears 38, 39 and second sun gear 40.

The second sun gear 40 forms the output stage of the planetary stage 31. It is permanently meshed with a number of planetary gears 39 and is fixedly attached to the differential housing 50. The differential housing 50 contains a differential 51 that transmits rotation of the housing 50 to wheel shafts 52,53 of wheels 54, 55.

A multidisc wet clutch 48 is connecting and disconnecting the planetary carrier 35 with the differential housing 50.

The first sun gear 37 forms the input of the planetary gear stage 31 and is permanently meshed with a number of planetary gears 38. The first sun gear 37 is also connected to a multidisc brake 42 that is attached to the housing 43 of the gear assembly in a non-rotating manner. When the multidisc brake 42 is locked, the sun gear 37 is held stationary. When the multidisc brake 42 is released, the sun gear 37 is free to rotate on its support bearings 44,45.

Each of the planetary gears 38,39 is formed as a common compound gear unit that is supported on the planetary carrier 35 via bearings 46,47.

In gear 1 (high torque, low speed), the power flow goes through both gear reduction stages 34,36 and 31. The brake 42 is locked and the clutch 48 is released. Power is transmitted from the input pinion 34 to the gear wheel 36, to the first sun gear 37, to the planetary gears 38, to the planetary gears 39, to the second sun gear 40, to the differential housing 50, to the differential pin and gears 51, to the drive shafts 52,53 and to the car wheels 54,55.

Figure 3:
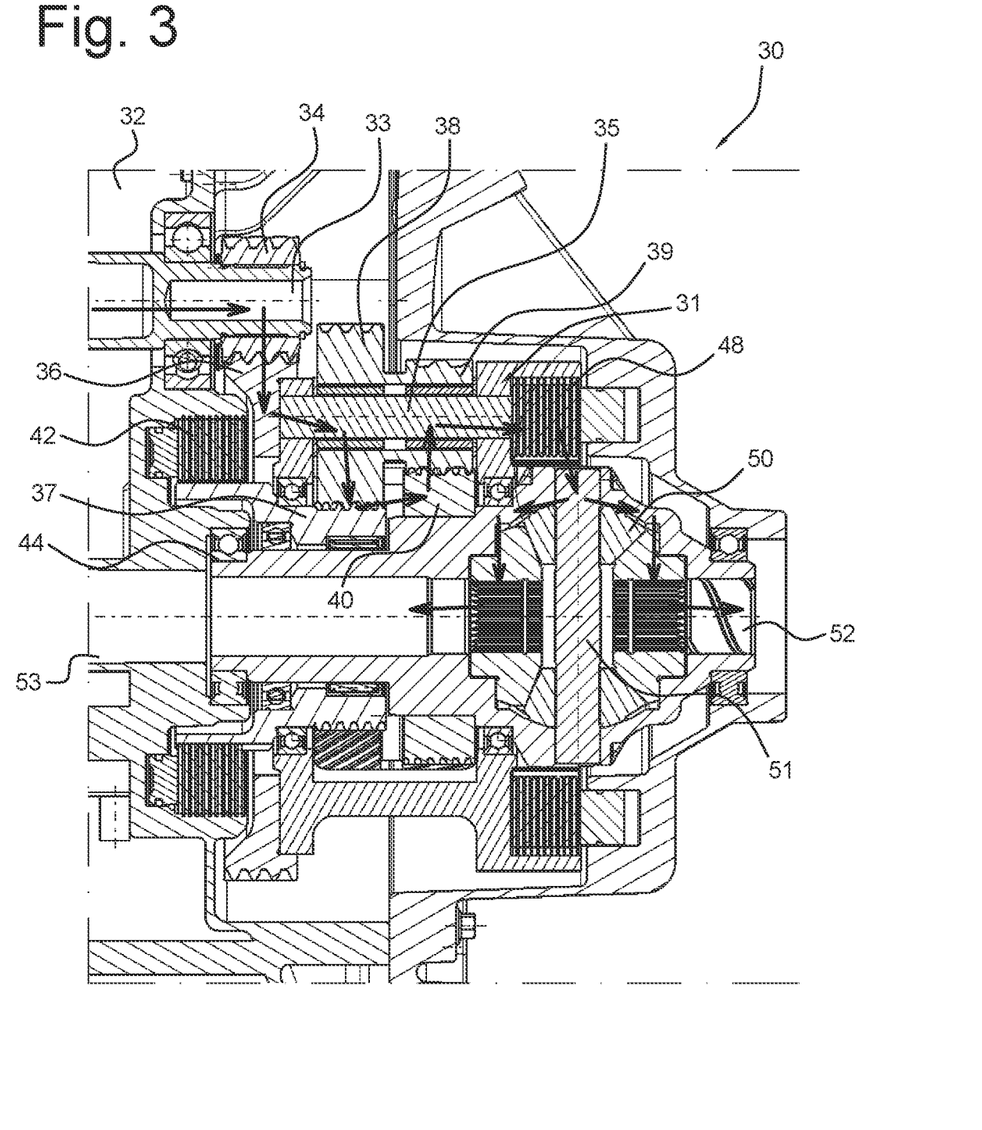
FIG. 3 shows the flow of power through the gear assembly of FIG. 2 in first gear.

In FIG. 3, the power flow through the gear reduction stages in first gear is indicated by the arrows.

As shown in FIG. 2, in gear 2 (low torque, high speed), the power flow goes only through gear reduction stage 1 that is formed by the pinion 34 and gear wheel 36. The brake 42 is released and the clutch 48 is locked so that it connects the planetary carrier 35 with the differential housing 50. The planetary gear stage 31 rotates as a lump mass together with the differential housing 50. Power is transmitted from the input pinion 34 to the gear wheel 36, to the planetary carrier 35, to the clutch 48, to the differential housing 50, to differential pin and gears 51, to the driveshafts 52,53 and the car wheels 54,55.

Figure 4:
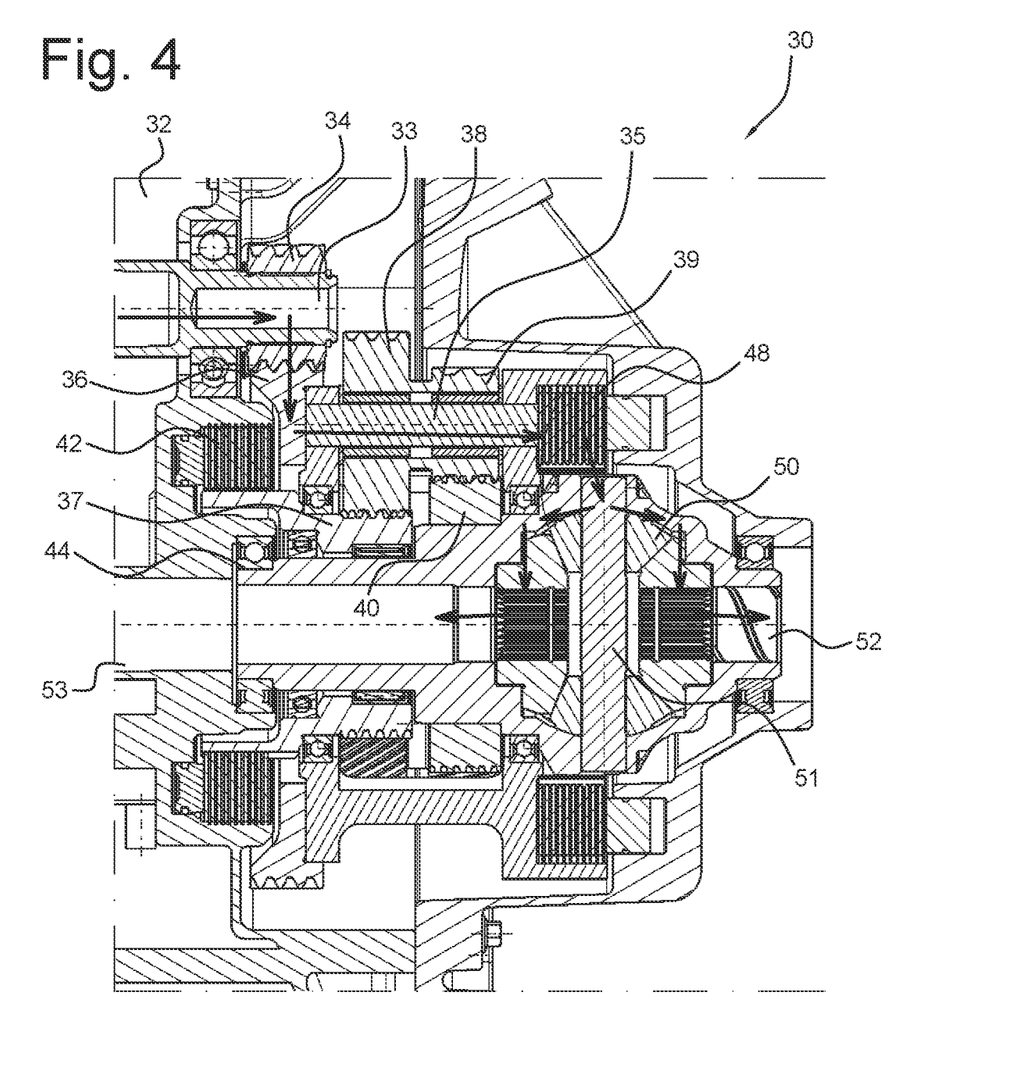
FIG. 4 shows the flow of power through the gear assembly of FIG. 2 in second gear.

In FIG. 4, the power flow through the gear reduction stages in second gear is indicated by the arrows.

Figure 5:
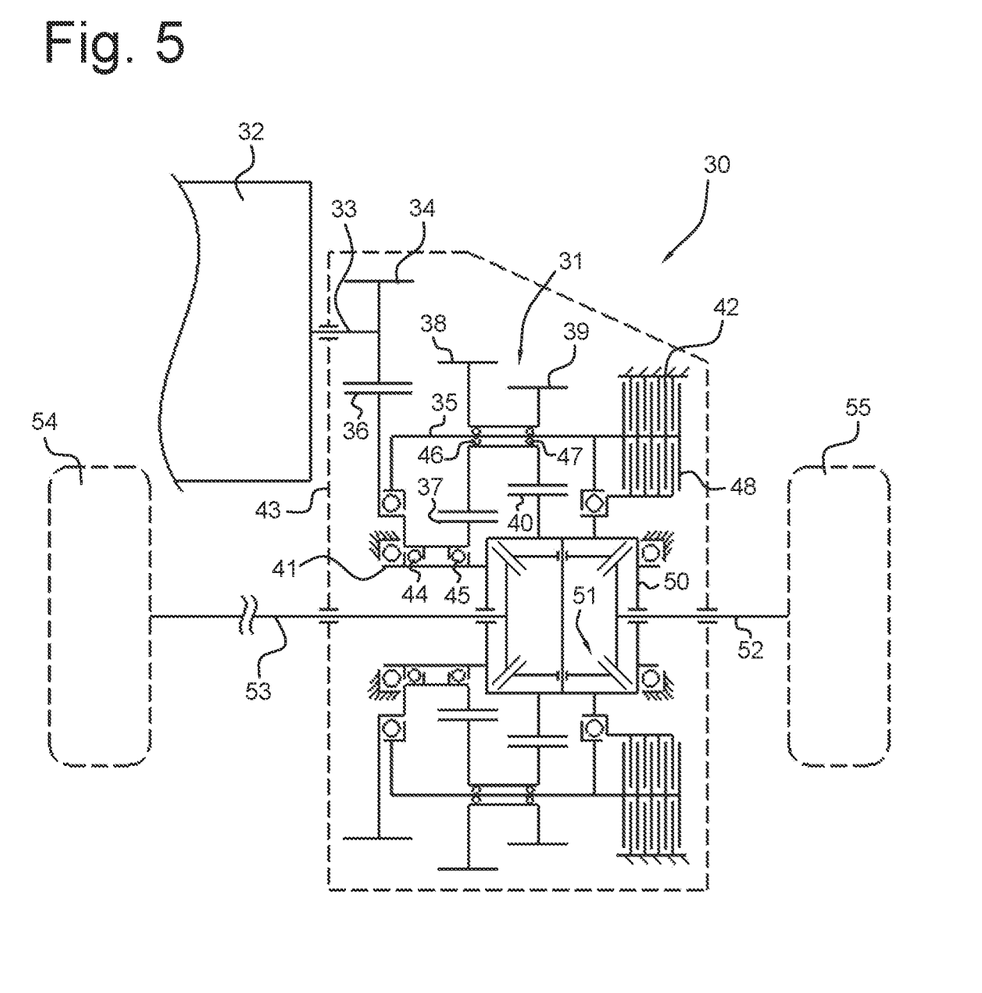
FIG. 5 shows a schematic view of a second embodiment of a gear assembly including a compound planetary gear.

FIG. 5 schematically shows another embodiment of a gear assembly 30 with a compound planetary gear stage 31. The rotor shaft 33 of the electric motor 32 and a pinion gear 34 are connected to a gear wheel 36 that is supported on a shaft 41 which is parallel to the rotor shaft 33. The pinion 34 and gear wheel 36 form the first gear reduction stage of the gear assembly 30.

The second gear reduction stage 31 of the gearbox, or gear assembly 31, is of the planetary type. The planetary gear set consists of the first sun gear 37, the planetary gears 38, the planetary gears 39 and the second sun gear 40.

The first sun gear 37 is firmly attached to the gear wheel 36 of the first stage and is concentric with it. The sun gear 37 and the gear wheel 36 form a unit which is supported by bearings 44,45 onto the differential housing 50. The first sun gear 37 is permanently meshed with a number of planetary gears 38.

The planetary gears 38,39 are formed as a common compound gear unit and the gears are supported via bearings 46, 47 on the planetary carrier 35.

The second sun gear 40 forms the output of the planetary gear set 31 and it is fixedly attached to the differential housing 50. The second sun gear 40 is permanently meshed with a number of planetary gears 39.

The multidisc wet clutch 48 connects and disconnects the planetary carrier 35 with the differential housing 50 in a slipping manner.

Multidisc brake 42 is operated to connect and disconnect the planetary carrier 35 with the gearbox housing 43 (a lock and release planetary carrier).

In gear 1 (high torque, low speed) the power flow goes through both gear reduction stages 34,36 and 31. The brake 42 is locked and the clutch 48 is released. The power is transmitted from the input pinion 34 to the gear wheel 36, to first sun gear 37, to the planetary gears 38, to the planetary gears 39, to the second sun gear 40, to the differential housing 50, to the differential pin and gears 51 and to the driveshafts 52,53 and the car wheels 54,55.

As shown in FIG. 5, in gear 2 (low torque, high speed) the power flow only goes through gear reduction stage 1 that is formed by pinion 34 and gear wheel 36. The brake 42 is released and the clutch 48 is locked. The clutch 48 connects the planetary carrier 35 with the differential housing 50 and the complete planetary gear stage 31 rotates as a lump mass together with differential housing 50. Power flows from the input pinion 34 to the gear wheel 36, to the first sun gear 37, to the planetary gears 38, to the planetary carrier 35, to the clutch 48, to the differential housing 50, to the differential pin and gears 51 and to the driveshafts 52,53 and the car wheels 54,55.

Figure 6:
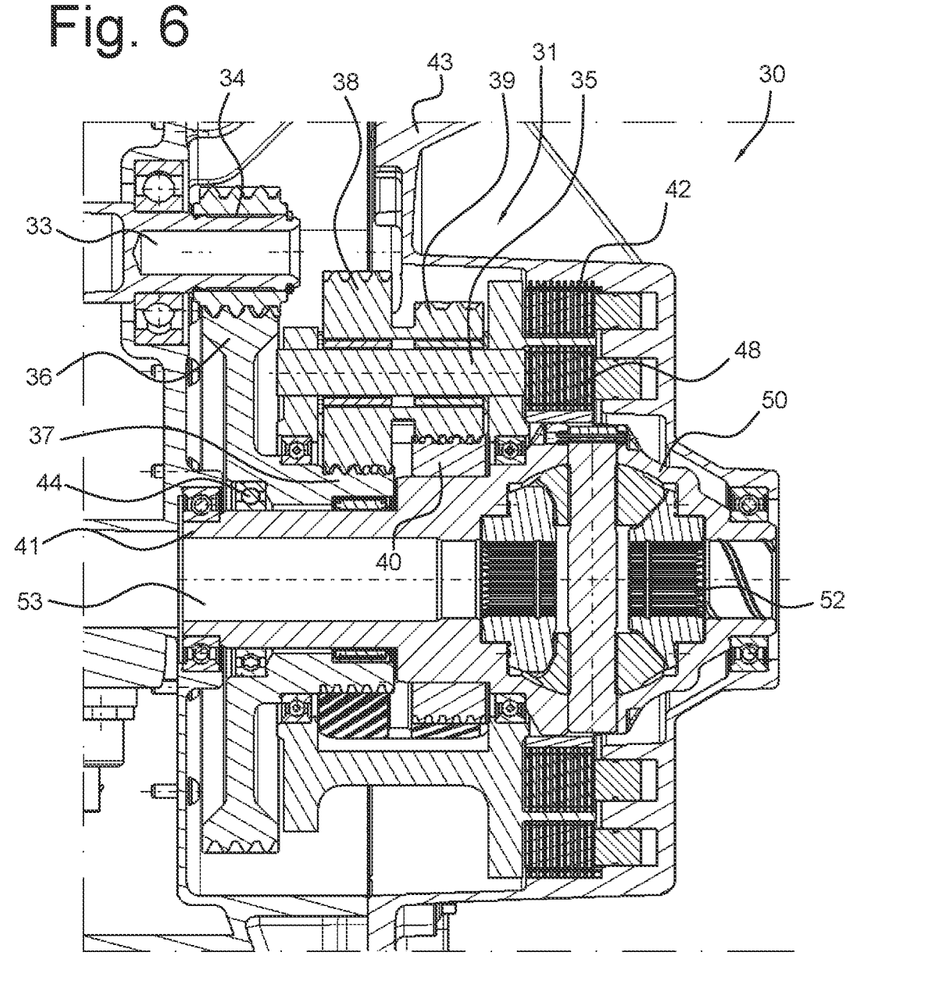
FIG. 6 shows a cross-sectional view of the gear assembly of FIG. 5.

In FIG. 6, a cross-sectional view of the gear assembly of FIG. 5 is shown.

The invention claimed is:

1. A gear assembly for use with an electric motor, the gear assembly comprising:
   a drive gear adapted to be connected to an output shaft of an electric motor, the drive gear being rotatable around a transmission axis;
   a planetary gear assembly comprising a sun gear, two or more planetary gear members rotatably supported on a carrier about respective planetary gear axes and meshing with one or more of the sun gear and a ring gear, an input stage connected to the drive gear, and an output stage adapted to be connected to a drive member for rotation of the drive gear about the transmission axis;
   a clutch member adapted for slippingly connecting the ring gear with the carrier or with the drive member; and
   a brake member adapted for fixedly engaging a part of the planetary gear assembly with a locking part of the gear assembly;
   wherein, in a low speed range of the gear assembly, the clutch member and the brake member are operated such that torque is transmitted from the drive gear to the planetary gear assembly, and through the output stage of the planetary gear assembly to the drive member; and
   wherein, in a high speed range of the gear assembly, the clutch member and the brake member are operated such that the carrier is fixedly connected to the drive member and is rotated about the transmission axis such that torque is transmitted from the drive gear to the drive member via the carrier.

2. The gear assembly according to claim 1, wherein the drive gear comprises a cylindrical gear rotatable around the transmission axis.

3. The gear assembly according to claim 1, wherein the transmission axis comprises a wheel axle and the drive member comprises a differential housing in an electric vehicle.

4. The gear assembly according to claim 1, wherein the planetary gear assembly comprises an outer ring, the planetary gear members meshing with the outer ring and with the sun gear, the outer ring being connectable to the drive member via the clutch member, wherein the brake member engages the outer ring.

5. The gear assembly according to claim 1, wherein:
   the planetary gear members are supported on the carrier at spaced-apart positions along a carrier axis to be jointly rotatable about the carrier axis;
   the drive gear engages the carrier for rotation of the carrier around the transmission axis;
   wherein the sun gear comprises a first sun gear and the output stage comprises a second sun gear;
   the first sun gear is rotatable about the transmission axis, meshing with the first planetary gear member;
   the second sun gear is rotatable about the transmission axis, fixedly connected to the drive member and meshing with the second planetary gear member;
   the brake member being is connected to the the first sun gear and to the locking part, which is non-rotating, for preventing rotation of the first sun gear about the transmission axis when the brake member is engaged; and
   the clutch member is arranged for connecting the carrier with the drive member.

6. The gear assembly according to claim 5, wherein:
   the planetary gear members are supported on the carrier at spaced-apart positions along a carrier axis to be jointly rotatable about the carrier axis;
   the drive gear engages the first sun gear for rotation of the first sun gear around the transmission axis, the first sun gear meshing with the first planetary gear member;
   the second sun gear is rotatable about the transmission axis, fixedly connected to the drive member and meshing with the second planetary gear member;
   the brake member is connected to the carrier and to the gearbox housing, which is non-rotating, for preventing rotation of the carrier about the transmission axis when the brake member is engaged; and
   the clutch member is arranged for connecting the carrier with the drive member.

* * * * *